June 13, 1972  B. LAINESSE  3,669,601
APPARATUS FOR INJECTION MOLDING
Filed Sept. 30, 1970  2 Sheets-Sheet 1

INVENTOR
Bruno LAINESSE

Alan Swabey
ATTORNEY

INVENTOR
Bruno LAINESSE

ATTORNEY

United States Patent Office 3,669,601
Patented June 13, 1972

3,669,601
APPARATUS FOR INJECTION MOLDING
Bruno Lainesse, 1010 Boule Douville,
St. Hyacinthe, Quebec, Canada
Filed Sept. 30, 1970, Ser. No. 76,724
Int. Cl. B29f 1/00
U.S. Cl. 425—249                    7 Claims

ABSTRACT OF THE DISCLOSURE

An injection molding machine incorporating at least two pairs of mating molding dies sandwiched between a pair of press platens, the extruder being provided with a reciprocal manifold having nozzles to cooperate with each of the pairs of molds, the manifold being movable to an advanced position for injection and to a retracted position to permit opening of the mold pairs.

BACKGROUND OF THE INVENTION

(a) Field of the invention

The present invention relates to an injection molding machine. More specifically, the present invention relates to a system for injection molding wherein the capacity of the system for a given clamping pressure may be increased.

(b) Description of prior art

The major cost and limiting factor of conventional injection molding equipment is in the clamping pressure system. As the size of the molded parts is increased or as production requirements necessitate the inclusion of more cavities for smaller parts into larger molds, the clamping pressure system must be redesigned to permit the application of sufficient clamping pressure to hold the platens closed under injection pressure.

It is therefore an object of the present invention to increase the capacity of a given machine without incurring a corresponding increase in platen pressures.

The present invention is based on the utilization of a plurality of molds in stacked relationship between a pair of platen press plates and to a system of distributing plastic to these molds from an injection device.

The present invention also provides a molding system wherein a plurality of discrete products may be formed between a pair of molding plates without necessitating the use of runners.

SUMMARY OF THE INVENTION

Briefly, from a broad aspect, the present invention provides an injection molding machine having a pair of press platens and a plurality of mating pairs of mold plates mounted in stacked relationship between the platens. The pairs of mold plates have mold cavities therebetween. Further, there is provided an extruding device and a manifold, the manifold connecting the extruding device to a cavity gate associated with each mold cavity whereby plastic material may be injected from the extruding device to the manifold and the cavity gates into the cavities in the mold plates. Further means are provided for heating the manifold.

BRIEF DESCRIPTION OF DRAWINGS

Further features, objects and advantages will be evident from the following detailed description of a preferred embodiment of the present invention taken in conjunction with the accompanying drawings in which.

DESCRIPTION OF PREFERRED EMBODIMENTS

Figure 1:
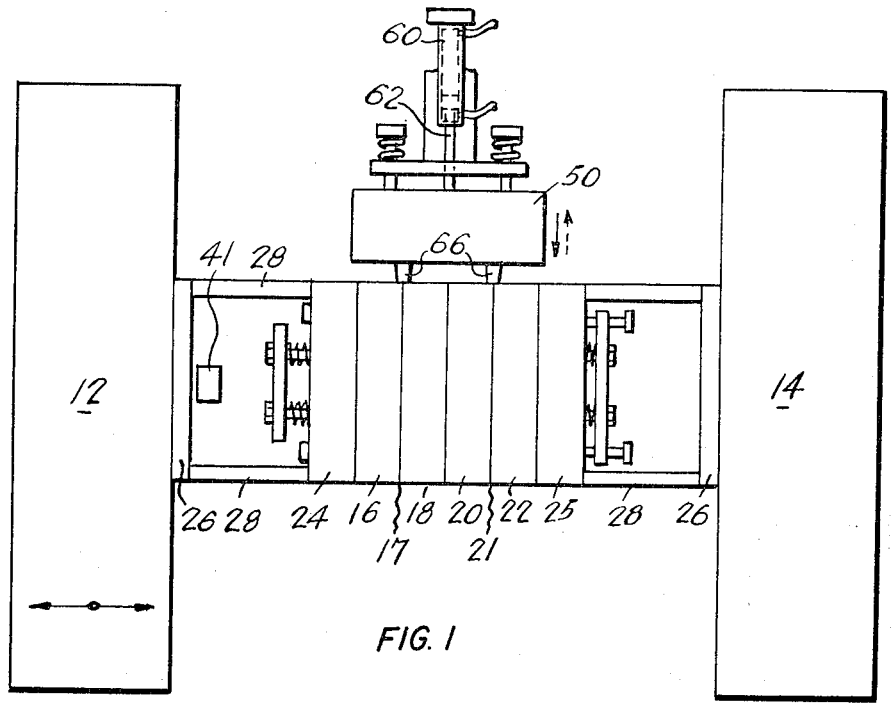
FIG. 1 is a schematic illustration of the present invention incorporating a plurality of pairs of mold plates between a single pair of press platens and having a manifold connecting the extruding device with the mold plates.
Figure 2:
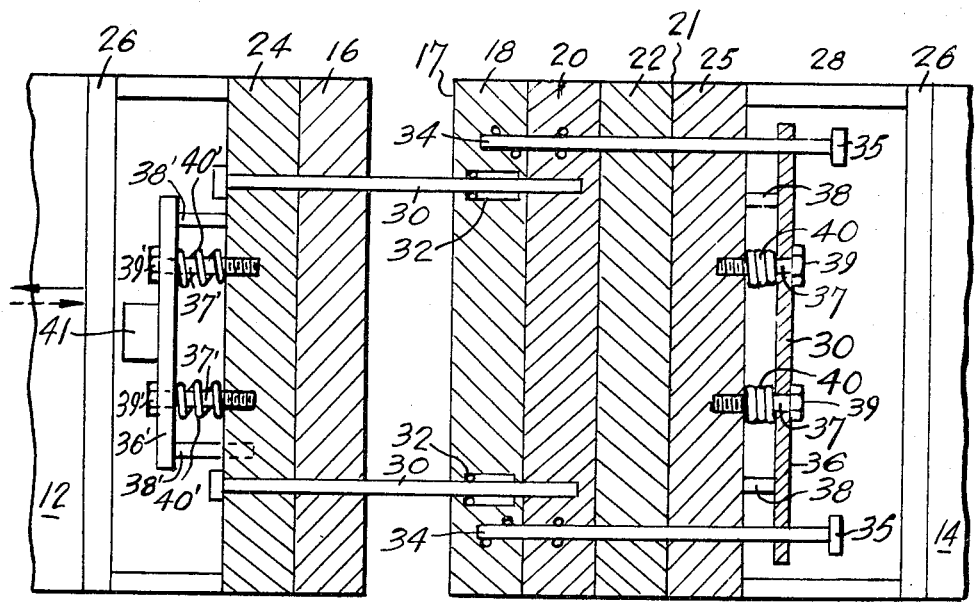
FIG. 2 is similar to FIG. 1, but showing the molds open and the manifold removed.
Figure 3:
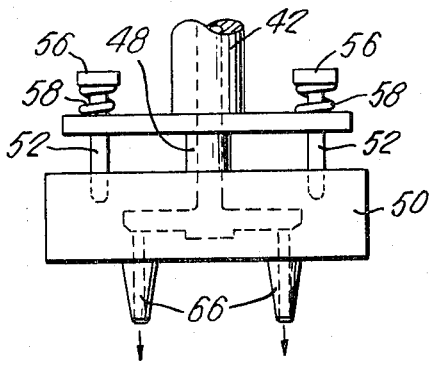
FIG. 3 is a plan view of a manifold constructed in accordance with the present invention.
Figure 4:
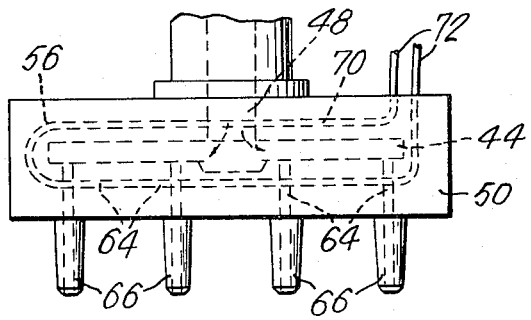
FIG. 4 is a side view of the manifold of FIG. 3.

Referring to FIGS. 1 and 2, there is shown a pair of opposed clamping platens 12 and 14, one of which say platen 14 is fixed. A pair of back to back cavity plates 18 and 20 and a pair of mating plates 16 and 22 respectively, are positioned between the platens and are spaced therefrom by framework 26, 28. The plates 16 and 18 and 20 and 22 combine to form mold cavities which meet in parting lines 17 and 21 respectively and are adapted to form the desired molded products.

The molds 16, 18, 20 and 22 are held between the plates 24 and 25 by means of suitable supporting and guiding rods. In FIG. 2, a pair of guide pins or rods 30 of a set of similar guide pins, is illustrated. Each pin 30 is mounted on the movable backing plate 24 and projects forwardly therefrom into the dies 18 and 20. A lost motion connection schematically indicated at 32 permits a controlled amount of relative movement between the dies 16 and 18 to open and close these dies along the parting line 17.

When the dies 16 and 18 have been open, the rods 30 have moved to the limit of their lost motion connections 32 so that now the molds 18 and 20 are moved as a unit by the continued opening of the platen 12 to open the dies 20 and 22 on their parting line 21. A second set of rods, two of which are indicated at 34 in FIG. 2, are fixed to the dies 18 and 20 and project through and are slidably received in suitable apertures in the die 22 and backing plate 25.

A suitable knock out plate 36 carrying knock out pins 38 is mounted for reciprocal movement on the back of plate 25 on suitable pins 37 and is biased outwardly away from the plate 25 by springs 40. These springs 40 force the plate 36 against the head 39 of the pin 37. The plates 36 are drilled to slidably receive the pins 34 and the pins 34 are provided with abutments 35 which are adapted to contact the back of the plate 36 toward the end of their travel and move same forward thereby moving the knock out pins 38 to a knock out position forcing the formed product out of the die 22.

A similar plate 36' is mounted on the back of plate 24 by means of a set of pins 37' and the plate 36' is biased against the head 39' of the pins 37' by a suitable set of springs 40'. The plate 36' is essentially the same as the plate 36 and incorporates knock out pins 38' similar to the pins 38. However, the plate 36' is operated by a fixed abutment 41 rather than by the abutment 35 on the guide pins 34.

The knock out plates 36, 36' and pins 38, 38' may be mounted and operated in any conventional manner.

The extruder 42 is provided in the illustrated arrangement with a reciprocal manifold 50. The manifold 50 is mounted on the front end of the extruder 42 by means of suitable pins 52 slidably received in suitable apertures in an end flange 54 on the extruder. Springs 58 encircle the pins 52 and are trapped between the flange 54 and the heads 56 of the pins. The springs 58 tend to hold the manifold 50 in retracted position.

The manifold 50 may be moved to its advance position during operation by any suitable means. In the illustrated arrangement, the manifold 50 is moved by suitable hydraulic cylinder 60 and piston 62 arrangement connected to the extruder 42 and manifold 50 respectively. This cylinder 60 and piston 62 arrangement may be actuated by any suitable means, for example, by means of a micro switch sensing the location of the plate 24 and actuating a solenoid valve introducing hydraulic fluid into the cylinder 60.

The manifold 50, in the illustrated arrangement, has a substantially H-shaped confined passage formed by a pair of parallel legs 44 and a connecting passage 46. The passage 46 has a conduit 48 extending substantially perpendicular thereto. The conduit 48 is connected to the extrusion orifice of the extruding device 42 and is slidable in and out in sealing relationship with the manifold 50. A plurality of interconnecting conduits 64 connect the legs 44 of the H-shaped passage with a plurality of extrusion orifices 66. These orifices 66 are adapted to cooperate with the cavity gates 58 in the plates 16, 18, 20 and 22 (see FIGS. 5 and 6).

The manifold 50 is heated by any suitable means. In the illustrated embodiment, an electric heater 70 connected by suitable leads 72 to a source of electrical energy has been shown. The heater 70 may be controlled at any desired temperature by a suitable thermostat means not shown. The manifold 50 maintains the material contained therein in plastic condition so that it may be easily extruded through the orifices 66.

Figure 5:
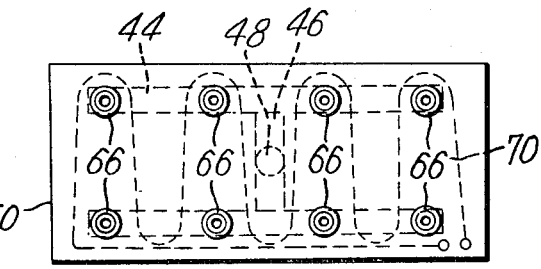
FIG. 5 is a front view of the manifold of FIG. 3.
Figure 6:
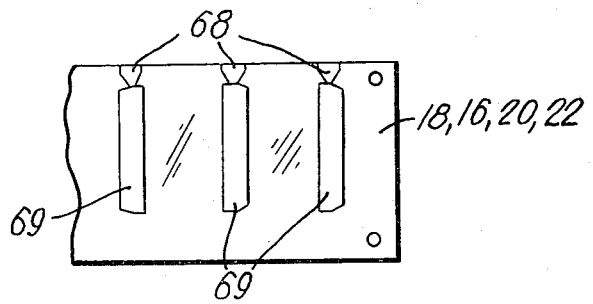
FIG. 6 is a partial front face view of a molding die illustrating one form of mold for use with the present invention.

As shown in FIGS. 5 and 6, each of the plates 16, 18, 20 and 22 is provided with a plurality of cavity gates 68 which connect each discrete cavity 69 directly with one of the extrusion orifices 66 of the manifold 50. Thus, with the illustrated system no runners need be formed between the plates 16, 18, 20 and 22 but instead, a runner system is provided exteriorly of the molds in the H-shaped passages within the manifold 50. By divorcing the runners from the molds and providing a heater to maintain same in plastic condition, the extra work required in reclaiming same is eliminated.

The invention may be operated as follows:

The platen 12 is closed, thereby moving the dies 16, 18, 20 and 22 into the closed position illustrated in FIG. 1 and the manifold 50 is then moved to its forward position so that the nozzles 66 are received in sealed position to direct material into the cavity 69. The cylinder 60 and piston 62 are actuated, if desired, automatically by means of the mcro switch sensing the position of the plate 24 as above described so that the manifold 50 is advanced at the proper time. Once the manifold is in sealing relationship on the parting lines 17 and 21, plastic may be injected through the nozzles 66 into the cavity 69.

When the cavities have been filled, the cylinder and piston arrangement 60, 62 is actuated to retract the manifold 50 thereby moving the nozzles 66 from the cavity gate 68 and clearing the nozzles so that the dies 16, 18 and 20 may now move laterally. When the dies 66 have been retracted, the platen 12 is then retracted to first separate the mold plates 16 and 18 on parting line 17 through the lost motion connection 34 and then to separate the molds 20 and 22 along parting line 21 due to the connection of the rod 32 and lost connection 34. Movement to the extreme open position causes the abutments 35 to contact and move the plate 36 and thus the pins 38 to eject the molded product from the mold 22. At the same time, the plate 36' or an abutment thereon has contacted the fixed abutment 41 and is moved relative to the plate 16 by the continued movement of the platen 12 with the plate 16 connected thereto, thereby operating the pins 38' to eject molded parts from the mold 16.

The illustrated embodiment only has shown two stacked decks or pairs of cavity punch plates. However, the present invention is not to be limited thereto. More pairs of plates may be incorporated between the platens provided, of course, means are provided to strip the molds and the manifold is redesigned to provide orifices matching with each parting line between mold plates and the individual cavity gates of the mold cavities.

Similarly, while the illustrated plates 16, 18, 20 and 22 are free of runners, if desired, the stack mold system may also be used with plates incorporating a runner distribution system, thereby reducing the total number of orifices 66 to at least one for each pair of cooperating mold plates.

I claim:

1. An injection molding machine comprising a pair of press platens, a plurality of mating pairs of mold plates mounted in stacked relationship between said platens, said pairs of mold plates having mold cavities therebetween, an extruding device, a manifold, said manifold connecting said extruding device to a cavity gate associated with each said mold cavities whereby plastic material may be injected from said extruding device through said manifold and said cavity gates into said cavities in said mold plates, and means for heating said manifold.

2. A machine as defined in claim 1, wherein said manifold connects said extruding device to each of said pairs of dies on a parting line between said pair of dies.

3. A machine, as defined in claim 2, wherein said manifold includes a confined passage, means connecting said confined passage to said extruder, and means for connecting said confined passage to a plurality of extrusion orifices through which material may be injected into said cavities of each of said pair of plates.

4. A machine, as defined in claim 2, wherein said manifold is reciprocal from an operative to a retracted position.

5. An apparatus, as defined in claim 1, wherein each said pair of mating mold plates has a plurality of discrete mold cavities therein, individual cavity gates in said mold plates for each of said discrete cavities with a plurality of extrusion orifices in said manifold, said extrusion orifices communicating with said individual cavity gates to inject material into said discrete mold cavities.

6. A machine, as defined in claim 3, wherein said manifold is reciprocal from an operative to a retracted position.

7. An apparatus, as defined in claim 4, wherein each said pair of mating mold plates has a plurality of discrete mold cavities therein, individual cavity gates in said mold plates for each of said discrete cavities with a plurality of extrusion orifice in said manifold, said extrusion orifices communicating with said individual cavity gates to inject material into said discrete mold cavities.

References Cited
UNITED STATES PATENTS

| | | | |
|---|---|---|---|
| 2,372,177 | 3/1945 | Conner | 18 DIG 51 |
| 2,574,663 | 10/1951 | Sampson | 249—72 |
| 2,983,983 | 5/1961 | Mayer | 249—129 |

FOREIGN PATENTS

| | | | |
|---|---|---|---|
| 1,194,317 | 1959 | France | 18—30 NP |

H. A. KILBY, Jr., Primary Examiner

U.S. Cl. X.R.

249—126; 425—234, 250

Disclaimer 3,669,601.—*Bruno Lainesse*, St. Hyacinthe, Quebec, Canada. APPARATUS FOR INJECTION MOLDING. Patent dated June 13, 1972. Disclaimer filed Dec. 22, 1975, by the inventor.

Hereby enters this disclaimer to claims 1, 2, 3, 4 and 6 of said patent.

[*Official Gazette February 10, 1976.*]